US012500680B2

(12) United States Patent
Fahnestock et al.

(10) Patent No.: US 12,500,680 B2
(45) Date of Patent: *Dec. 16, 2025

(54) METHODS AND APPARATUS TO MONITOR A SPLIT SCREEN MEDIA PRESENTATION

(71) Applicant: The Nielsen Company (US), LLC, New York, NY (US)

(72) Inventors: Justin David Lee Fahnestock, Tampa, FL (US); John C. Kistenmacher, Brunswick, ME (US); Ronan Heffernan, Wesley Chapel, FL (US); Scott Daniel Barraclough, New Port Richey, FL (US); John Wesley Kercher, IV, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/068,398

(22) Filed: Dec. 19, 2022

(65) Prior Publication Data
US 2023/0119783 A1 Apr. 20, 2023

Related U.S. Application Data

(63) Continuation of application No. 17/099,350, filed on Nov. 16, 2020, now Pat. No. 11,532,159, which is a
(Continued)

(51) Int. Cl.
H04H 60/37 (2008.01)
G06T 7/11 (2017.01)
(Continued)

(52) U.S. Cl.
CPC ............ H04H 60/372 (2013.01); G06T 7/11 (2017.01); G06T 7/13 (2017.01); G06V 10/25 (2022.01);
(Continued)

(58) Field of Classification Search
USPC .................... 382/190, 305; 725/9–10, 18–19
See application file for complete search history.

(56) References Cited

U.S. PATENT DOCUMENTS 5,481,294 A * 1/1996 Thomas ................. H04H 60/40
725/19
6,658,168 B1 12/2003 Kim
(Continued)

OTHER PUBLICATIONS

United Staes Patent and Trademark Office, "Notice of Allowance and Fee(s) Due," issued in connection with U.S. Appl. No. 16/033,018, mailed on Jul. 6, 2020, 9 pages.
(Continued)

Primary Examiner — Ishrat I Sherali

(57) ABSTRACT

Methods, apparatus, systems and articles of manufacture are disclosed to monitor a split screen media presentation. Example apparatus includes means for processing audio output from a media device to determine audio metering data to identify first media presented by the media device, means for generating one or more video signatures associated with video output from the media device, and means for identifying a first region-of-interest of a split screen presentation of the media device including the first media, the means for identifying to identify the first region-of-interest in response to a determination that the one or more generated video signatures do not match reference video signatures corresponding to the first media.

20 Claims, 9 Drawing Sheets

Related U.S. Application Data continuation of application No. 16/033,018, filed on Jul. 11, 2018, now Pat. No. 10,839,225.

(51) Int. Cl.
| | | |
|---|---|---|
| *G06T 7/13* | (2017.01) | |
| *G06V 10/25* | (2022.01) | |
| *G06V 20/40* | (2022.01) | |
| *H04H 60/58* | (2008.01) | |
| *H04H 60/59* | (2008.01) | |

(52) U.S. Cl.
CPC ............ *G06V 20/46* (2022.01); *H04H 60/58* (2013.01); *H04H 60/59* (2013.01)

(56) References Cited

U.S. PATENT DOCUMENTS

| | | | | |
|---|---|---|---|---|
| 7,643,090 | B2* | 1/2010 | Ramaswamy | H04H 60/58 |
| | | | | 725/18 |
| 7,742,737 | B2 | 6/2010 | Peiffer et al. | |
| 8,065,697 | B2* | 11/2011 | Wright | H04H 60/40 |
| | | | | 725/115 |
| 8,189,945 | B2* | 5/2012 | Stojancic | G06V 10/464 |
| | | | | 382/154 |
| 8,213,521 | B2* | 7/2012 | Deng | H04N 21/44224 |
| | | | | 375/240.26 |
| 8,245,249 | B2* | 8/2012 | Lee | H04N 21/44008 |
| | | | | 725/18 |
| 8,260,055 | B2* | 9/2012 | Wright | G06V 20/40 |
| | | | | 382/209 |
| 8,553,148 | B2 | 10/2013 | Ramaswamy et al. | |
| 8,682,651 | B2* | 3/2014 | Diggins | H04H 60/59 |
| | | | | 704/203 |
| 8,768,003 | B2* | 7/2014 | McMillan | G06F 16/152 |
| | | | | 714/732 |
| 9,986,288 | B2* | 5/2018 | Besehanic | G06V 20/46 |
| 10,631,068 | B2* | 4/2020 | Navin | H04N 21/41407 |
| 10,839,225 | B2* | 11/2020 | Fahnestock | H04H 60/372 |
| 11,140,439 | B2* | 10/2021 | Stojancic | G10H 1/0008 |
| 11,532,159 | B2* | 12/2022 | Fahnestock | H04H 60/58 |
| 2002/0041705 | A1 | 4/2002 | Lin et al. | |
| 2005/0232411 | A1 | 10/2005 | Srinivasan et al. | |
| 2008/0198094 | A1 | 8/2008 | Laughlin | |
| 2009/0007169 | A1* | 1/2009 | Headley | H04N 21/25891 |
| | | | | 725/46 |
| 2009/0123025 | A1* | 5/2009 | Deng | G06V 20/635 |
| | | | | 725/60 |
| 2010/0131970 | A1 | 5/2010 | Falcon | |
| 2010/0303365 | A1* | 12/2010 | Zhang | H04N 21/234363 |
| | | | | 382/203 |
| 2011/0026763 | A1* | 2/2011 | Diggins | H04H 60/58 |
| | | | | 381/2 |
| 2012/0020559 | A1 | 1/2012 | Deng et al. | |
| 2013/0251189 | A1* | 9/2013 | McMillan | H04N 21/84 |
| | | | | 382/100 |
| 2014/0002749 | A1* | 1/2014 | Pora | H04N 21/4394 |
| | | | | 348/725 |
| 2016/0078459 | A1* | 3/2016 | Borland | H04L 67/306 |
| | | | | 705/7.33 |
| 2016/0094601 | A1* | 3/2016 | Besehanic | H04L 67/60 |
| | | | | 709/219 |
| 2017/0041655 | A1* | 2/2017 | Harrison | H04N 21/812 |
| 2020/0019787 | A1 | 1/2020 | Fahnestock et al. | |
| 2021/0073550 | A1 | 3/2021 | Fahnestock et al. | |

OTHER PUBLICATIONS

United Staes Patent and Trademark Office, "Notice of Allowance and Fee(s) Due," issued in connection with U.S. Appl. No. 17/099,350, mailed on Aug. 17, 2022, 8 pages.

* cited by examiner

METHODS AND APPARATUS TO MONITOR A SPLIT SCREEN MEDIA PRESENTATION

CROSS REFERENCE TO RELATED APPLICATIONS

This patent arises from a continuation of U.S. patent application Ser. No. 17/099,350, now U.S. Pat. No. 11,532,159, filed on Nov. 16, 2020, which is a continuation of U.S. patent application Ser. No. 16/033,018, now U.S. Pat. No. 10,839,225, filed on Jul. 11, 2018. The entire disclosures of U.S. patent application Ser. No. 17/099,350 and U.S. patent application Ser. No. 16/033,018 are hereby incorporated by reference in their respective entireties.

FIELD OF THE DISCLOSURE

This disclosure relates generally to audience measurement, and, more particularly, to methods and apparatus to monitor a split screen media presentation.

BACKGROUND

Audience measurement of media (e.g., broadcast television and/or radio, stored audio and/or video content played back from a memory such as a digital video recorder or a digital video disc, a webpage, audio and/or video media presented (e.g., streamed) via the Internet, a video game, etc.) often involves collection of media identifying data (e.g., signature(s), fingerprint(s), code(s), tuned channel identification information, time of exposure information, etc.) and people data (e.g., user identifiers, demographic data associated with audience members, etc.). The media identifying data and the people data can be combined to generate, for example, media exposure data indicative of amount(s) and/or type(s) of people that were exposed to the monitored piece(s) of media.

BRIEF DESCRIPTION OF THE DRAWINGS

The figures are not to scale. In general, the same reference numbers will be used throughout the drawing(s) and accompanying written description to refer to the same or like parts.

DETAILED DESCRIPTION

Figure 1:
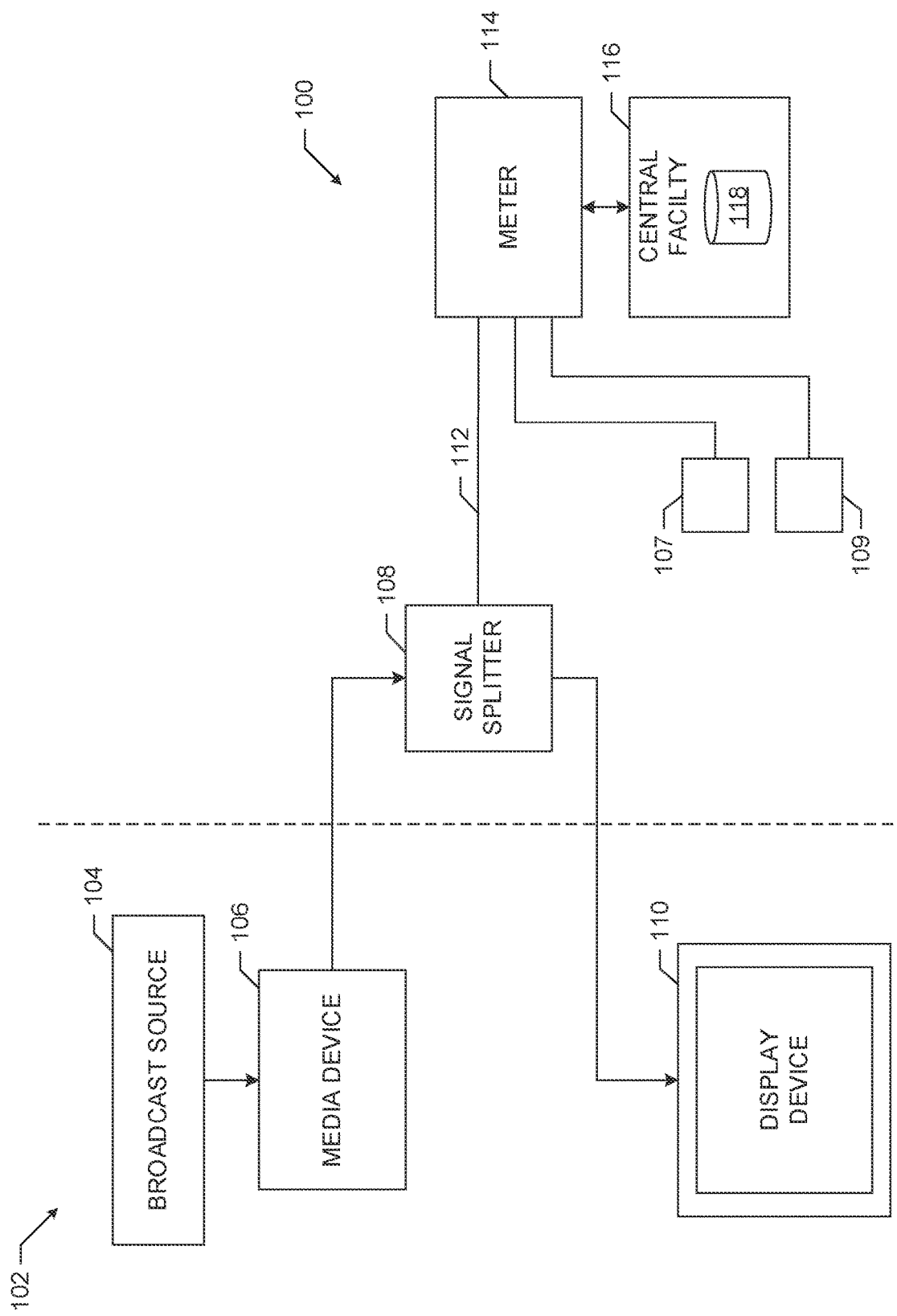
FIG. 1 is a block diagram of an example media monitoring system coupled to an example media entertainment system and structured to monitor split screen media presentations in accordance with teachings of this disclosure.

An audience measurement entity (e.g., The Nielsen Company (US), LLC) can calculate ratings for a first piece of media (e.g., a television program) by correlating data collected from a plurality of panelist sites with the demographics of the panelist. For example, at each panelist site where the first piece of media is detected in the monitored environment at a first time, media identifying information for the first piece of media is correlated with presence information detected in the environment at the first time. The results from multiple panelist sites are combined and/or analyzed to provide ratings representative of exposure of a population to the first piece of media. As used herein, the term "media" includes any type of content and/or advertisement delivered via any type of distribution medium. Thus, media includes television programming or advertisements, radio programming or advertisements, movies, web sites, streaming media, etc.

As used herein, "broadcast" refers to any sort of electronic transmission of signals from a source to multiple receiving devices. Thus, a "broadcast" may be a cable broadcast, a satellite broadcast, a terrestrial broadcast, a traditional free television broadcast, a radio broadcast, and/or an internet broadcast, and a "broadcaster" may be any entity that transmits signals for reception by a plurality of receiving devices. The signals may include content, (also referred to herein as "programs"), and/or commercials (also referred to herein as "advertisements"). An "advertiser" is any entity that provides an advertisement for inclusion in a broadcast signal.

As is well known, advertisers pay significant sums of money to broadcasters to have their commercials/advertisements broadcast in association with particular programs at particular times (i.e., during a certain "time slot"). An audience measurement entity (e.g., The Nielsen Company (US), LLC) can monitor media (e.g., commercials, television broadcasts, movies, etc.) to which users are exposed. To monitor the broadcasting of commercials, monitoring stations may be installed at various locations in various broadcasting areas. These monitoring stations collect information indicative of the different media (e.g., commercials, television broadcasts, movies, etc.) broadcast in their associated broadcasting areas, the times/dates at which the media were broadcast, and the stations or channels that broadcast those media. The collected information may be in an analog and/or a digital format. The information collected for each piece of media identified by the monitoring stations may be some or all of the media as broadcast, signatures for some or all of the media as broadcast (e.g., a proxy uniquely representative of the content of the commercial), and/or watermarks and/or other codes associated with, and possibly broadcast with, the media. The collected information typically uniquely identifies the piece of media with which it is associated. It may also identify the station broadcasting the media and/or the channel on which the media was broadcast and the time/date on which the media was broadcast.

Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

Unlike media monitoring techniques based on codes and/or watermarks included with and/or embedded in the monitored media, fingerprint or signature-based media monitoring techniques generally use one or more inherent characteristics of the monitored media during a monitoring time interval to generate a substantially unique proxy for the media. Such a proxy is referred to as a signature or fingerprint, and can take any form (e.g., a series of digital values, a waveform, etc.) representative of any aspect(s) of the media signal(s) (e.g., the audio and/or video signals forming the media presentation being monitored). A signature may be a series of signatures collected in series over a timer interval. A good signature is repeatable when processing the same media presentation, but is relatively unique relative to other (e.g., different) presentations of other (e.g., different) media. Accordingly, the term "fingerprint" and "signature" are used interchangeably herein and are defined herein to mean a proxy for identifying media that is generated from one or more inherent characteristics of the media.

Signature-based media monitoring generally involves determining (e.g., generating and/or collecting) signature(s) representative of a media signal (e.g., an audio signal and/or a video signal) output by a monitored media device and comparing the monitored signature(s) to one or more reference signatures corresponding to known (e.g., reference) media sources. Various comparison criteria, such as a cross-correlation value, a Hamming distance, etc., can be evaluated to determine whether a monitored signature matches a particular reference signature. When a match between the monitored signature and one of the reference signatures is found, the monitored media can be identified as corresponding to the particular reference media represented by the reference signature which matched the monitored signature. Because attributes, such as an identifier of the media, a presentation time, a broadcast channel, etc., are collected for the reference signature, these attributes may then be associated with the monitored media whose monitored signature matched the reference signature. Example systems for identifying media based on codes and/or signatures are long known and were first disclosed in Thomas, U.S. Pat. No. 5,481,294, which is hereby incorporated by reference in its entirety.

In some examples, each monitoring station of an audience measurement entity is in communication with a central facility. The central facility is typically provided with a database storing the audio/video codes and/or signatures that are used to identify known media. When a piece of media is monitored in a broadcast, the central facility compares the audio/video code and/or signature representative of the broadcast to the reference codes and/or reference signatures stored in the database to automatically identify the piece of media. If a matching code and/or signature is found in the database, the piece of media is identified from the database. The identity of the piece of media is then stored in a memory. The identity of the piece of media is typically stored in association with a time and/or a date stamp identifying the time/date at which the piece of media was broadcast and an identification of the channel on which the piece of media was broadcast.

In some examples, in the event an identification of the media is not achieved (e.g., the media is not yet identified in the database because, for example, the video codes and/or signatures do not match any reference video codes and/or signatures in the database), the monitoring station determines that the media needs further processing to be identified and monitored. In some examples, the central facility is able to identify the media by matching audio codes/signatures representative of the broadcast to the codes/signatures stored in the database. However, in some such examples, the video signatures of the broadcast may not match the video signatures of the identified media. Such a mismatch can occur during a split screen media presentation by a monitored media device. In such examples, prior monitoring stations may be unable to reliably monitor the media because the video signatures of the broadcast do not match the video signatures of the identified media.

Example systems, methods, and apparatus disclosed herein include an audio processor to process audio output from a media device to determine audio metering data to identify first media presented by the media device, a video signature generator to generate one or more video signatures associated with video output from the media device, and a computer vision processor to identify a first region-of-interest of a split screen presentation of the media device including the first media in response to a determination that the one or more generated video signatures do not match reference video signatures corresponding to the first media.

In some examples, the audio metering data includes at least one of audio signatures or audio watermarks. In some examples, a monitoring data communicator is to transmit audio metering data and the one or more generated video signatures to a central facility, and receive, from the central facility, an indication that the one or more generated video signatures do not match reference video signatures. Examples disclosed herein include an image creator to capture one or more images representative of the video output from the media device. In some examples, the computer vision processor is to process the one or more captured images to identify candidate regions-of-interest, and to cause the video signature generator to generate respective video signatures for respective ones of the candidate regions-of-interest, the first region-of-interest corresponding to a matching region-of-interest having video signatures corresponding to the first media.

In some examples, the computer vision processor is to determine that the first region-of-interest includes the first media in response to receiving an indication from a central facility that the respective video signatures for the first region-of-interest correspond to first media. In some examples, the computer vision processor is to identify candidate regions-of-interest using at least one process of edge detection, line detection, feature detection, or feature extraction. Examples disclosed herein include an image variation detector to divide the one or more captured images representative of the video output of the media device into a plurality of sub-regions, and determine inter-frame variation associated with each sub-region. Examples disclosed herein include an image sub-region encoder to create one or more encoded synthetic images representative of the inter-frame variation associated with each sub-region. Examples disclosed herein also include a region-of-interest segmenter to segment the one or more synthetic images into the candidate regions-of-interest.

A block diagram of an example media monitoring system 100 structured to identify a piece of media in a split screen presentation provided via an example media entertainment system 102 is illustrated in FIG. 1. The example media entertainment system 102 includes an example media source 104, an example media device 106, and a display device 110. The example media monitoring system 100 includes an example signal splitter 108, an example meter 114, an example microphone sensor 107, an example camera sensor 109, and an example central facility 116. The example central facility 116 includes an example monitoring database 118. The components of the media entertainment system 102 and the media monitoring system 100 may be connected in any appropriate manner including that shown in FIG. 1 in which the meter 114 is configured to monitor media exposure associated with the media device 106 and/or display device 110. In some examples, in a statistically selected household having one or more media entertainment systems 102, the meter 114 may be implemented as a single home unit and one or more site units. In such a configuration, the single home unit performs the functions of storing data and forwarding the metering data to the central facility 116 for subsequent processing and/or storage. Each site unit is coupled to a corresponding media entertainment system 102 and performs the functions of collecting metering data to the single home unit for that home. The home unit receives and stores the metering data collected by the site units and subsequently forwards that metering data to the central facility 116. As another example, some or all of the first example media monitoring system 100 can be implemented in a single media device, such as the media device 106, the display device 110, a computer system, a multimedia computing device (e.g., such as a gaming device, a mobile phone, a personal digital assistant (PDA), etc.), etc.

The media source 104 may be any media source, such as a cable television provider, a satellite television service provider, a direct satellite feed, a radio frequency (RF) television service provider, an internet streaming video/audio provider (e.g., such as Hulu, Inc.) a video-on-demand (VOD) provider, a digital versatile disk (DVD) player, a video cassette recorder (VCR), a video game console, a digital video recorder (DVR), etc. The media source 104 may provide analog and/or digital television signals to the media entertainment system 102, for example, over a coaxial cable or via a wireless connection.

The media device 106 may be any multimedia device, such as a mobile phone, a set-top box, a gaming device, a personal digital assistant (PDA), a cable television converter, a direct broadcast satellite (DBS) decoder, a video cassette recorder (VCR), etc. In the illustrated example of FIG. 1, the media device 106 is a set-top box that receives a plurality of broadcast channels from the media source 104. Typically, the media device 106 selects one of a plurality of broadcast channels based on a user input, and outputs one or more signals received via the selected broadcast channel. In the case of an analog signal, the media device 106 tunes to a particular channel to obtain programming delivered on that channel from the media source 104. For a digital signal, the media device 106 may tune to a channel and decode certain packets of data to obtain programming delivered on a selected channel. For example, the media device 106 may tune to a major channel and then extract a program carried on a minor channel within the major channel via the decoding process mentioned above. For some media entertainment systems 102, for example, those in which the media source 104 is a standard RF analog television service provider or a basic analog cable television service provider, the media device 106 may not be present as its function is performed by a tuner in the display device 110.

An output from the media device 106 is fed to a signal splitter 108, such as a single analog y-splitter in the case of an RF coaxial connection between the media device 106 and the display device 110, an audio/video splitter in the case of a direct audio/video connection between the media device 106 and the display device 110, a digital data splitter in the case of a digital data interface (e.g., such as a high-definition multimedia interface (HDMI)) used to connect the media device 106 and the display device 110, etc. (For configurations in which the media device 106 is not present, the media source 104 may be coupled directly to the signal splitter 108 or the signal splitter 108 may be replaced with a connection from an audio/video output of the display device 110). In the example media entertainment system 102, the signal splitter produces two signals indicative of the output from the media device 106. Of course, a person of ordinary skill in the art will readily appreciate that any number of signals may be produced by the signal splitter 108.

In the illustrated example, one of the two signals from the signal splitter 108 is fed to the display device 110 and the other signal is delivered to the meter 114. The display device 110 may be any type of television or television display device. For example, the display device 110 may be a television or television display device that supports the National Television Standards Committee (NTSC) standard, the Phase Alternating Line (PAL) standard, Système Électronique pour Couleur avec Mémoire (SECAM) standard, a standard developed by the Advanced Television Systems Committee (ATSC), such as high definition television (HDTV), a standard developed by the Digital Video Broadcasting (DVB) Project, or may be a multimedia computer system, etc.

The second of the two signals from the signal splitter 108 (i.e., the signal carried by connection 112 in FIG. 1) is coupled to an input of the meter 114. In an example implementation, the meter 114 implements a data logging and processing unit that may be used to generate viewing records and other viewing information useful for determining viewing and other metering information. Such an example meter 114 may collect a set of viewing records and transmit the collected viewing records to the central facility 116. The connection 112 may be a telephone line, a return cable television connection, an RF or satellite connection, an Internet connection or the like. In some examples, the audio output from the media device 106 and/or the display device 110 is processed and/or monitored by the microphone sensor 107. For example, the audio output from the media device 106 and/or display device 110 may be detected by the microphone sensor 107 and provided to the meter 114. In some examples, the video output from the media device 106 and/or the display device 110 is processed and/or monitored by the camera sensor 109. For example, the camera sensor 109 may be coupled with an image capturing device, such as a framegrabber, to capture images displaying on the media device 106 and/or the display device 110. In some such examples, the camera sensor 109 may provide captured images from the video output to the meter 114.

In the illustrated example, the meter 114 is configured to determine identifying information corresponding to a piece of media being output by the media device 106 during a split screen presentation. For example, a split screen presentation may include two or more regions of interest in which respective pieces of media are displayed simultaneously, while only one region of interest corresponds to the audio output from the media device 106. The meter 114 in the illustrated example is configured to identify, in combination with the central facility 116, which region of interest of the split screen presentation corresponds to the piece of media that corresponds to the audio output from the media device 106.

In an example implementation, the meter 114 may be configured to generate audio signatures and/or video signatures and/or extract audio and/or video watermarks from the audio output and video output from the media device 106 (received via connection 112) to identify the displayed media. In some examples, the meter 114 may generate audio and video signatures for a single frame or successive frames of the broadcast from the media device 106. The meter 114 generates audio and/or video signatures to identify the media that is being displayed. Monitoring reports of the identified media are sent by the meter 114 to the central facility 116 to be stored in a monitoring database 118. In other examples, the meter 114 may comprise the monitoring database 118 of monitoring reports. The meter 114 and the central facility 116 are in communication to identify the piece of media displayed via a split screen presentation.

In some examples, the audio output from the media device 106 and/or display device 110 is processed to detect audio code(s) (e.g., audio watermark(s)) and/or generate audio signature(s) of the displayed media. The video output from the media device 106 and/or display device 110 is processed to generate video signature(s) of the displayed media. When the video signature(s) do not match the media identified by the audio code(s) and/or audio signature(s), the meter 114 determines that the media device 106 is providing a split screen presentation. In some examples, the meter 114 performs segmentation processing of the displayed media to identify a region-of-interest (ROI) of the split screen presentation that matches the media identified by the audio code(s) and/or audio signature(s). In some examples, the meter 114 implements any image segmentation technique or combination of techniques to segment that displayed media into candidate ROI(s), and then the meter 114 generates video signature(s) for each candidate ROI. The generated video signature(s) for each candidate ROI may be compared to reference video signature(s) of the reference media identified by the audio code(s) and/or audio signature(s) to determine which candidate ROI's video signature(s) match the video signature(s) of the identified media. In some examples, the matching candidate ROI is identified as the detected ROI corresponding to the audio output from the media device 106. In some examples, the meter 114 may store the location of the detected ROI for use as a template to improve future matching times of split screen presentations. In some examples, the segmentation may be improved by performing segmentation on successive frames, comparing the segmentations, and removing spurious segmentation lines from consideration. In some examples, the split screen media identification may be implemented without requiring a trigger condition of the generated video signature(s) not matching the media identified by the audio code(s) and/or audio signature(s). In some such examples, the meter 114 may perform segmentation on the displayed media continuously. Split-screen media identification is disclosed in detail with connection to FIGS. 2A-2B, 3.

Figure 2A:
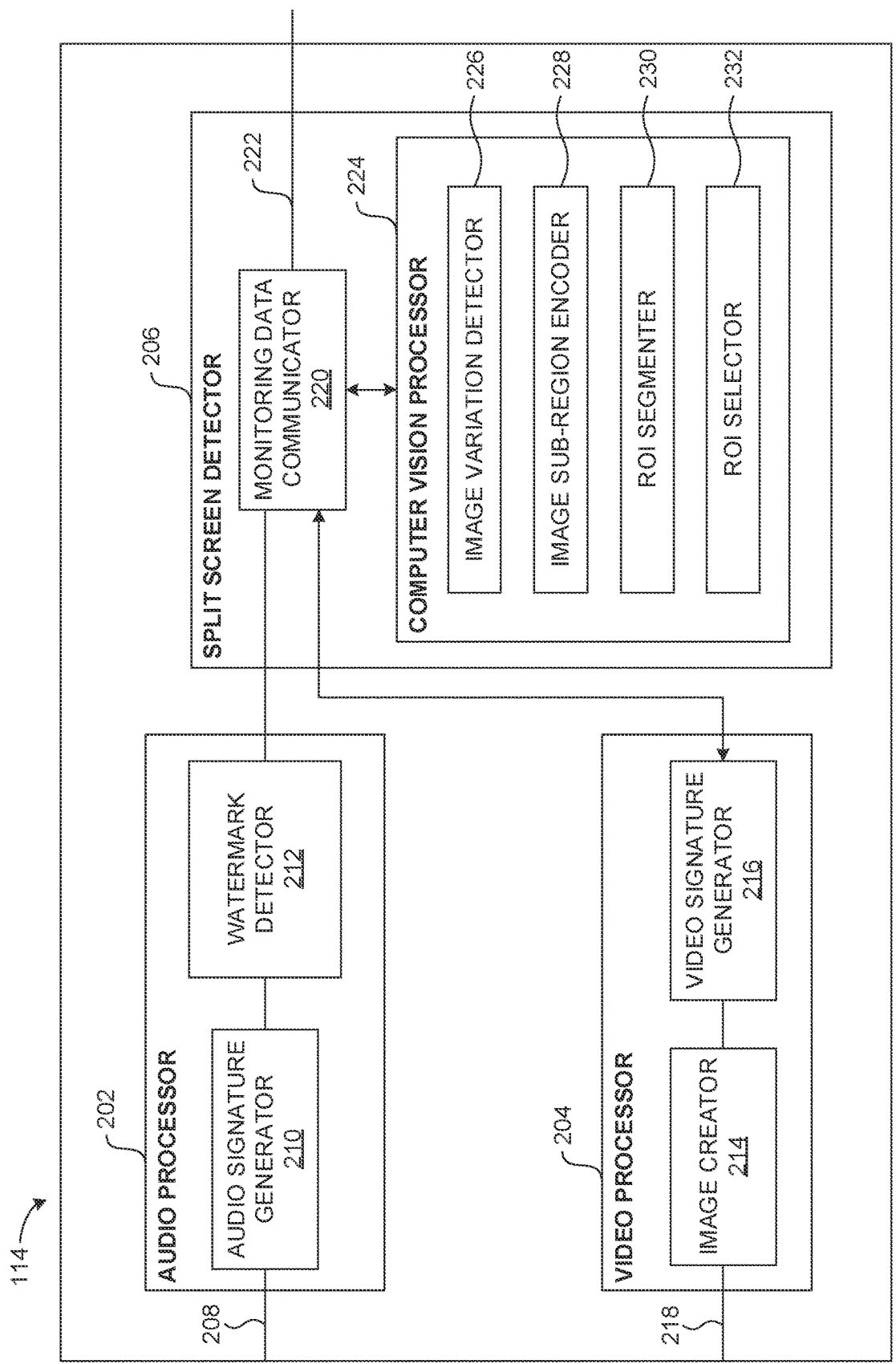
FIG. 2A is a block diagram of an example meter that may be used to implement the example media monitoring system of FIG. 1.

A block diagram of an example implementation of the meter 114 of FIG. 1 is illustrated in FIG. 2A. The example meter 114 includes an example audio processor 202, an example video processor 204, and an example split screen detector 206. The example audio processor 202 processes the audio from an example audio input 208 configured to receive an audio signal provided by a media device (e.g., such as the example media device 106 and/or the example display device 110 of FIG. 1). For example, the audio signal received by the audio input 208 may correspond to audio obtained from the signal splitter 108 and/or the microphone sensor 107. The audio processor 202 processes the audio provided by the media device 106 to obtain audio metering data for identification of the media presented by the media device 106. In the illustrated example, the audio processor 202 includes an example audio signature generator 210 and/or an example watermark detector 212. As such, the audio metering data may include audio signatures and/or audio watermarks. The example audio signature generator 210 generates one or more audio signatures corresponding to the media. Any technique or combination of techniques for generating audio signatures may be implemented by the example audio signature generator 210. Furthermore, although each audio signature may not uniquely identify particular media, successive audio signatures generated from the audio input together may form a set of audio signatures that can uniquely represent a particular piece of media. The example watermark detector 212 extracts one or more watermarks embedded in the audio of a piece of media using any appropriate technique or combination of techniques. The example audio processor 202 sends the generated audio signature(s) and/or the extracted watermark(s) corresponding to the audio received by the audio input 208 to the example monitoring data communicator 220 of the split screen detector 206.

In the illustrated example, the video processor 204 includes an example image creator 214 and an example video signature generator 216. The example image creator 214 accepts a video signal received via an example video input 218. For example, the video signal received by the video input 218 may correspond to video obtained from the signal splitter 108 and/or the camera sensor 109. In the illustrated example, the image creator 214 captures one or more images representative of the video output provided by the example media device 106 and/or the example display device 110. The captured image(s) from the image creator 214 is encoded with one or more properties/information that can aid in future image segmentation processes. The image creator 214 sends the captured image(s), which corresponds to media provided by a media device (e.g., such as the example media device 106 of FIG. 1), to the example video signature generator 216. The video signature generator 216 generates one or more video signatures corresponding to media provided by the media device. In the illustrated example, each video signature is generated by examining the pixels in captured image. Any technique or combination of techniques for generating video signatures may be implemented by the example video signature generator 216. Furthermore, although each signature may not uniquely identify particular media, successive video signatures generated by successive captured images from the image creator 214 together form a set of video signatures that can uniquely represent particular media. The example video signature generator 216 sends the generated video signature(s) and the captured image(s) to the example monitoring data communicator 220.

The example monitoring data communicator 220 transmits the audio metering data (e.g., the generated audio signature(s) and/or detected audio watermark(s)) and video signature(s) to the example match communicator 234 of the central facility 116 (see FIG. 2B) via an example connection 222. The example connection 222 may be a wireless Internet connection, a telephone line, a return path connection, an RF or satellite connection, etc. The processing performed by the central facility 116 is described in more detail below in connection with FIG. 2B.

In the illustrated example of FIG. 2A, the monitoring data communicator 220 receives an indication from the central facility 116 of whether or not the generated video signature (s) substantially match the piece of media identified by the audio metering data (e.g., the generated audio signature(s) and/or the detected audio watermark(s). When the video signature(s) representative of the media provided by the media device 106 substantially match reference video signature(s) of the matched reference media (i.e., the piece of media identified by the audio metering data), the central facility 116 transmits an indication to the monitoring data communicator 220 that the video signature(s) generated from the video output by the media device 106 corresponds to the matched reference media. However, if the central facility 116 transmits an indication to the monitoring data communicator 220 that the generated video signature(s) do not match the video signature(s) of the matched reference media, then the monitoring data communicator 220 may trigger an indication to the computer vision processor 224 that there was a low video match score. In response, the example computer vision processor 224 determines that the media provided by the media device 106 is in a split screen presentation.

When a split screen presentation is determined, the captured image(s) from the image creator 214 are processed by the computer vision processor 224 using image segmentation and other processes to identify a region of interest of the split screen presentation corresponding to the matched reference media associated with the output audio. The example computer vision processor 224 includes an example image variation detector 226, an example image sub-region encoder 228, an example region-of-interest (ROI) segmenter 230, and an example region-of-interest (ROI) selector 232. The example image variation detector 226 determines inter-frame variation (e.g., difference and/or motion) associated with each sub-region of the input captured image obtained via the video input 218. For example, the image variation detector 226 divides an input captured image into a plurality of sub-regions, with each sub-region corresponding to a pixel or predefined grouping of pixels. The example image variation detector 226 then determines the inter-frame variation (e.g., difference and/or motion) associated with each sub-region of the input captured image. In an example implementation, the example image variation detector 226 determines such inter-frame variation by comparing the sub-regions of the current input captured image with the corresponding sub-regions of one or more previous input captured image. Any appropriate image processing technique for determining variation (e.g., difference or motion) from successive capture images of a video presentation may be used to perform such a comparison. In another example implementation, the example image variation detector 226 determines the inter-frame variation of each sub-region of the captured image by extracting properties/information indicative of inter-frame variation from the encoded video stream. Examples of such information include MPEG motion vectors that may be used to determine the motion associated with a particular sub-region, and static macroblocks that may be used to determine the absence of motion in a particular sub-region.

Either approach for inter-frame variation (e.g., difference and/or motion) determination may be used depending upon the particular application. For example, the successive image frame comparison approach may be used to determine inter-frame variation for analog or digital media. The information/properties extraction approach is applicable primarily to digital media, but does not require the buffering and comparison of successive image frames.

Returning to FIG. 2A, the example image sub-region encoder 228 creates a synthetic image representative of the inter-frame variation (e.g., difference and/or motion) associated with the sub-regions of the input captured image as determined by the example image variation detector 226. For example, the image sub-region encoder 228 takes the inter-frame variation determination made by the example image variation detector 226 for each sub-region of the input captured image and encodes the determined variation (e.g., difference and/or motion) as a particular color and/or pattern in the respective sub-region of the determined synthetic image. The particular encoded color and/or pattern used for a particular sub-region of the determined synthetic image depends upon the type of variation detected in the respective sub-region of the input captured image. For example, the example image sub-region encoder 228 may represent motion to the left, right, up and down in a sub-region of the generated synthetic image by different first, second, third and fourth colors and/or patterns, respectively. Additionally, a fifth color and/or pattern may be used to represent inter-frame differences not associated with motion, such as differences associated with the abrupt scene changes, gradual fading in and/or out of objects in a scene, etc. Additionally or alternatively, a sixth color and/or pattern may be used to represent the absence of motion and/or substantially no inter-frame difference associated with the particular sub-region. The example ROI segmenter 230 segments a synthetic image determined by the example image sub-region encoder 228 into a plurality of candidate ROIs. In the illustrated example, the ROI segmenter 230 implements any appropriate edge detection, line detection, feature detection, feature extraction or similar technique, such as Canny edge detection, the generalized Hough transform, etc., to detect edges in the synthetic image. Because the synthetic image is made up of candidate ROIs each encoded to represent a particular inter-frame variation (e.g., difference and/or motion), the detected edges will correspond to boundaries between different types of inter-frame variation. Accordingly, each segmented ROI of the synthetic image corresponds to one or more connected sub-regions (e.g., pixels or group of pixels) that together exhibit one of the following characteristics: (1) variation (e.g., motion) in a substantially uniform direction, (2) substantially no variation, or (3) substantially non-uniform variation (e.g., substantially non-uniform differences and/or motion) but which are bounded by regions exhibiting either variation (e.g., motion) in a substantially uniform direction or substantially no variation.

In some examples, the image variation detector 226 and the image sub-region encoder 228 can be omitted from the computer vision processor 224. In such examples, the ROI segmenter 230 receives the captured image via the video input 218. In response, the ROI segmenter 230 converts the captured image to a grayscale image using any appropriate technique or combination of techniques. The ROI segmenter 230 segments the grayscale image into a plurality of ROIs. In some examples, the ROI segmenter 230 implements any appropriate edge detection, line detection, feature detection, feature extraction or similar technique, such as Canny edge detection, the generalized Hough transform, etc., to detect edges in the grayscale image.

In the illustrated example of FIG. 2A, the example ROI selector 232 receives the set of candidate ROIs from the ROI segmenter 230. The ROI selector 232 generates respective sets of one or more video signatures corresponding to each of the plurality of candidate ROIs. In the illustrated example, video signature(s) for a given candidate ROI are generated by examining the pixels in that ROI of the original image frame from which the synthetic image was generated. Any technique for generating video signatures may be used to implement the example ROI selector 232. Furthermore, although each signature from a candidate ROI may not uniquely identify particular media in that candidate ROI of the captured image, successive video signatures generated by successive synthetic images together form a set of video signatures that can uniquely represent particular media within that candidate ROI. Once the example ROI selector 232 generates video signature(s) for each candidate ROI of the original captured image, the ROI selector 232 transmits the candidate ROI video signature(s) to the monitoring data communicator 220. The example monitoring data communicator 220 transmits the candidate ROI video signature(s) to the central facility 116. When the video signature(s) representative of a candidate ROI substantially match reference video signature(s) of the matched reference media (i.e., the piece of media identified by the audio metering data), the central facility 116 transmits an indication to the monitoring data communicator 220 that the candidate ROI corresponds to the matched reference media. The monitoring data communicator 220 then transmits the indication to the ROI selector 232, and the ROI selector 232 identifies the matching candidate ROI as the detected ROI corresponding to the audio output from the media device providing the media (e.g., the media device 106 from FIG. 1). However, if the central facility 116 transmits an indication to the monitoring data communicator 220 that no match is detected (i.e., the video signatures for all candidate ROIs do not match the reference video signatures of the matched reference media), then the monitoring data communicator 220 may trigger an indication to the computer vision processor 224 that there was a low video match score and the captured image should be re-segmented to create a new set of candidate ROIs. This re-segmentation process may be iterated until a match is found.

Once the video output is matched to the audio output by determining the detected ROI, the meter 114 monitors the identified piece of media and the example monitoring data communicator 220 may report monitoring data to the central facility 116 via connection 222 for record storage. In some examples, the monitoring data may include audio metering data, video signature(s), identifying metadata, etc. In some examples, the split screen detector 206 saves the location of the detected ROI as a template to improve video signature matching times in future split screen orientation occurrences. For example, the split screen detector 206 may save the location of the detected ROI along with identifying metadata (e.g., broadcast channel, a timestamp, a title of a television show, etc.) to use as a template ROI for generating video signature(s) prior to conducting an image segmentation process.

In another example, the computer vision processor 224 performs image segmentation on media provided by a media device (e.g., the media device 106 from FIG. 1) continuously. For example, the computer vision processor 224 may constantly segment the media and determine candidate ROIs without the monitoring data communicator 220 triggering segmentation through an indication that there was a low video match score. In such examples, the computer vision processor 224 performs image segmentation and ROI determination in the same manner as described above.

Figure 2B:
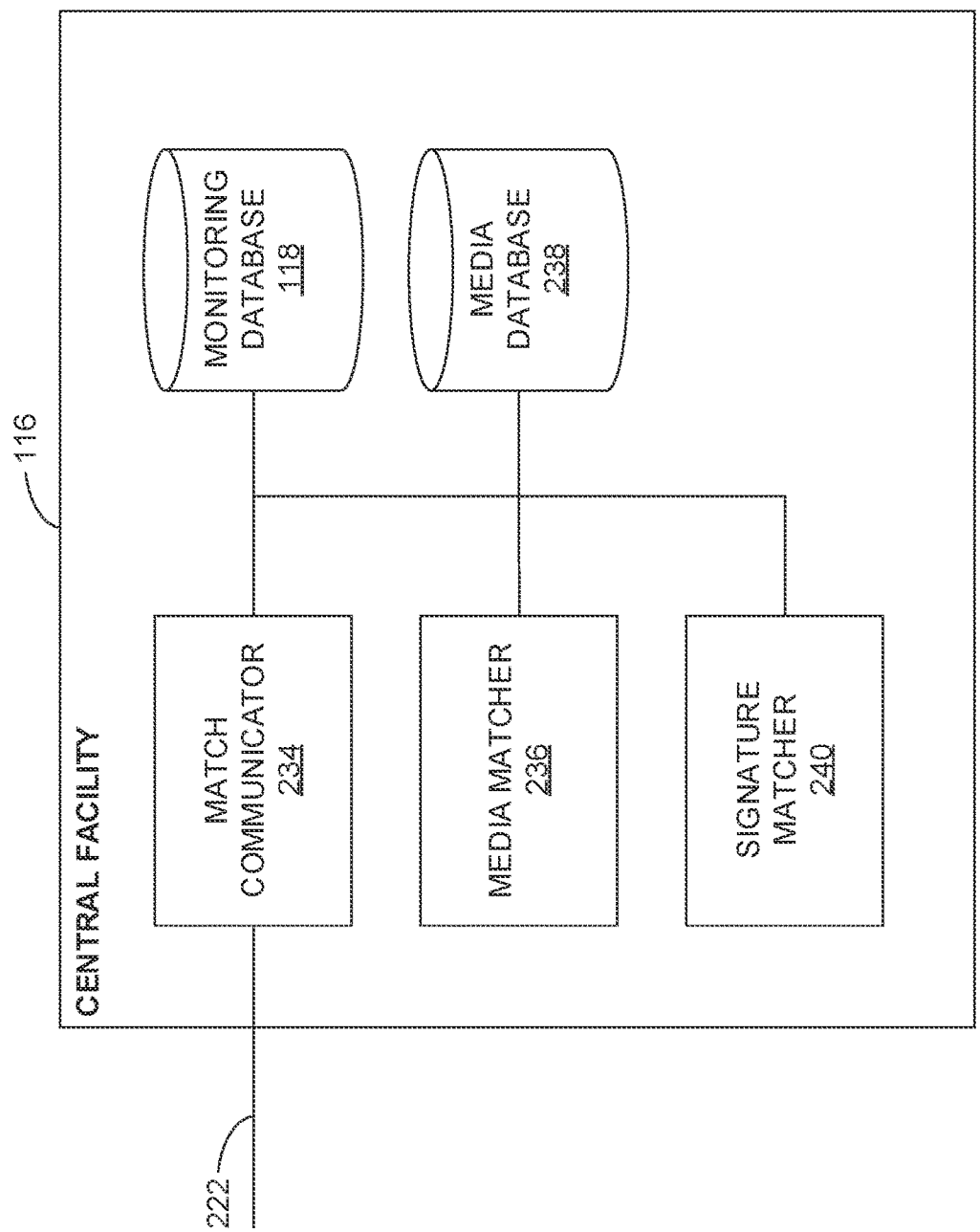
FIG. 2B is a block diagram of an example central facility that may be used to implement the example media monitoring system of FIG. 1.

A block diagram of an example implementation of the central facility 116 of FIG. 1 is illustrated in FIG. 2B. The example central facility 116 includes the monitoring database 118, an example match communicator 234, an example media matcher 236, an example signature matcher 240 and an example media database 238. In the illustrated example, the match communicator 234 receives the audio metering data (e.g., audio watermark(s) and/or audio signature(s)) and video signature(s) corresponding to the monitored media (i.e., the media presented by media device 106) from the meter 114 via an example connection 222. The example match communicator 234 transmits the audio metering data to the example media matcher 236. In the illustrated example, the media matcher 236 is communicatively coupled to the media database 238. The example media database 238 comprises audio/video reference signature(s) and/or watermark(s) of a plurality of reference media (e.g., such as movies, television programs, commercials, promotional content, infomercials, public service announcements, etc.). In the illustrated example, when generated audio signature(s) and/or watermark(s) representative of the media (i.e., media presented by media device 106) substantially match reference audio signature(s) and/or watermark(s) (e.g., a high audio match score is identified), the example media matcher 236 identifies the media as corresponding to the reference media represented by the matching reference signature(s) and/or watermark(s). (To improve identification accuracy, multiple signatures and/or watermarks generated/detected from the audio input may be required to match a corresponding reference signature/watermark or set of signatures/watermarks before the media is identified as corresponding to the matching reference media). In some examples, the media matcher 236 may match the generated audio signature(s) and/or watermark(s) to multiple reference media. For example, several commercials from the same advertiser may include the same audio output but have substantially different video output. In such examples, the media matcher 236 would match the generated audio signature(s) to a group of potential reference media with substantially the same audio output. The reference media identified by the example media matcher 236 is associated with corresponding audio and video signatures and/or watermarks. The example media matcher 236 transmits the video signatures of the identified reference media to the example signature matcher 240. The example match communicator 234 transmits the generated video signature(s) corresponding to media presented on media device 106 to the example signature matcher 240.

In the illustrated example of FIG. 2B, the signature matcher 240 compares the video signatures of the identified reference media (received from the example media matcher 236) to the generated video signature(s) reported by the meter 114 and corresponding to media presented on media device 106. In the illustrated example, when the generated video signatures reported by the meter 114 substantially match (e.g., a high video match score is identified by satisfying a high video score threshold) reference video signatures of the identified reference media, the example signature matcher 240 identifies the generated video signatures reported by the meter 114 as corresponding to the matched reference media. The example signature matcher 240 transmits identifying metadata corresponding to the identified media to the match communicator 234, and the match communicator 234 transmits the match indication to the meter 114 via connection 222. If no match is detected, the example signature matcher 240 may trigger an indication to the match communicator 234 that there was a low video match score. The example match communicator 234 then transmits the indication to the meter 114 via connection 222.

In some examples, the example match communicator 234 receives the candidate ROI video signature(s) from the meter 114 via connection 222. The match communicator 234 transmits the candidate ROI video signature(s) to the example signature matcher 240. The example signature matcher 240 compares the candidate ROI video signature(s) to the video signature(s) of the matched reference media (received previously from the example media matcher 236 matching the audio metering data). If video signatures representative of a candidate ROI substantially match (e.g., the video match score is high and exceeds a high threshold) the reference video signatures of the matched reference media, the signature matcher 240 transmits an indication to the match communicator 234 that the candidate ROI corresponds to the matched reference media. In response, the example match communicator 234 transmits the indication of the candidate ROI corresponding to the matched reference media to the meter 114 via connection 222. If none of the video signatures representative of the different candidate ROIs match the video signatures of the matched reference media, then the example signature matcher 240 may transmit an indication to the match communicator 234 that there was a low video match score. In response, the example match communicator 234 transmits the indication of the low video match score to the meter 114 via connection 222. This process may be iterated until a match is found. In some examples, the match communicator 234 of the central facility 116 receives a monitoring report from the meter 114 corresponding to the monitoring of the matched media. In such examples, the central facility 116 may store the monitoring report in the monitoring database 118 of the illustrated example.

In some examples, the signature matcher 240 compares the candidate ROI video signatures(s) to the video signatures(s) of the identified reference media and an indeterminate match is found (e.g., the video match exceeds of otherwise satisfies an indeterminate match threshold but does not satisfy a full match threshold). In some such examples, when an indeterminate video match score is obtained, the signature matcher 240 indicates that the media needs to be re-segmented resulting in a second plurality of candidate ROIs to be processed in the same manner as described above.

While an example manner of implementing the media monitoring system 100 of FIG. 1 is illustrated in FIGS. 2A-2B, one or more of the elements, processes and/or devices illustrated in FIG. 2A-2B may be combined, divided, re-arranged, omitted, eliminated and/or implemented in any other way. Further, the example audio processor 202, the example video processor 204, the example split screen detector 206, the example audio signature generator 210, the example watermark detector 212, the example image creator 214, the example video signature generator 216, the example monitoring data communicator 220, the example computer vision processor 224, the example image variation detector 226, the example image sub-region encoder 228, the example ROI segmenter 230, the example ROI selector 232, the example match communicator 234, the example media matcher 236, the example signature matcher 240 and/or, more generally, the example media monitoring system 100 of FIG. 1 may be implemented by hardware, software, firmware and/or any combination of hardware, software and/or firmware. Thus, for example, any of the example audio processor 202, the example video processor 204, the example split screen detector 206, the example audio signature generator 210, the example watermark detector 212, the example image creator 214, the example video signature generator 216, the example monitoring data communicator 220, the example computer vision processor 224, the example image variation detector 226, the example image sub-region encoder 228, the example ROI segmenter 230, the example ROI selector 232, the example match communicator 234, the example media matcher 236, the example signature matcher 240 and/or, more generally, the example media monitoring system 100 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, audio processor 202, the example video processor 204, the example split screen detector 206, the example audio signature generator 210, the example watermark detector 212, the example image creator 214, the example video signature generator 216, the example monitoring data communicator 220, the example computer vision processor 224, the example image variation detector 226, the example image sub-region encoder 228, the example ROI segmenter 230, the example ROI selector 232, the example match communicator 234, the example media matcher 236, the example signature matcher 240 is/are hereby expressly defined to include a non-transitory computer readable storage device or storage disk such as a memory, a digital versatile disk (DVD), a compact disk (CD), a Blu-ray disk, etc. including the software and/or firmware. Further still, the example media monitoring system 100 of FIG. 1 may include one or more elements, processes and/or devices in addition to, or instead of, those illustrated in FIGS. 2A-2B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

A flowchart representative of example hardware logic or machine readable instructions for implementing the media monitoring system 100 of FIGS. 1, 2A-2B is shown in FIGS. 3A-3B, 4, 5. The machine readable instructions may be a program or portion of a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIGS. 3A-3B, 4, 5, many other methods of implementing the example media monitoring system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 1, 2A-2B may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 3A:
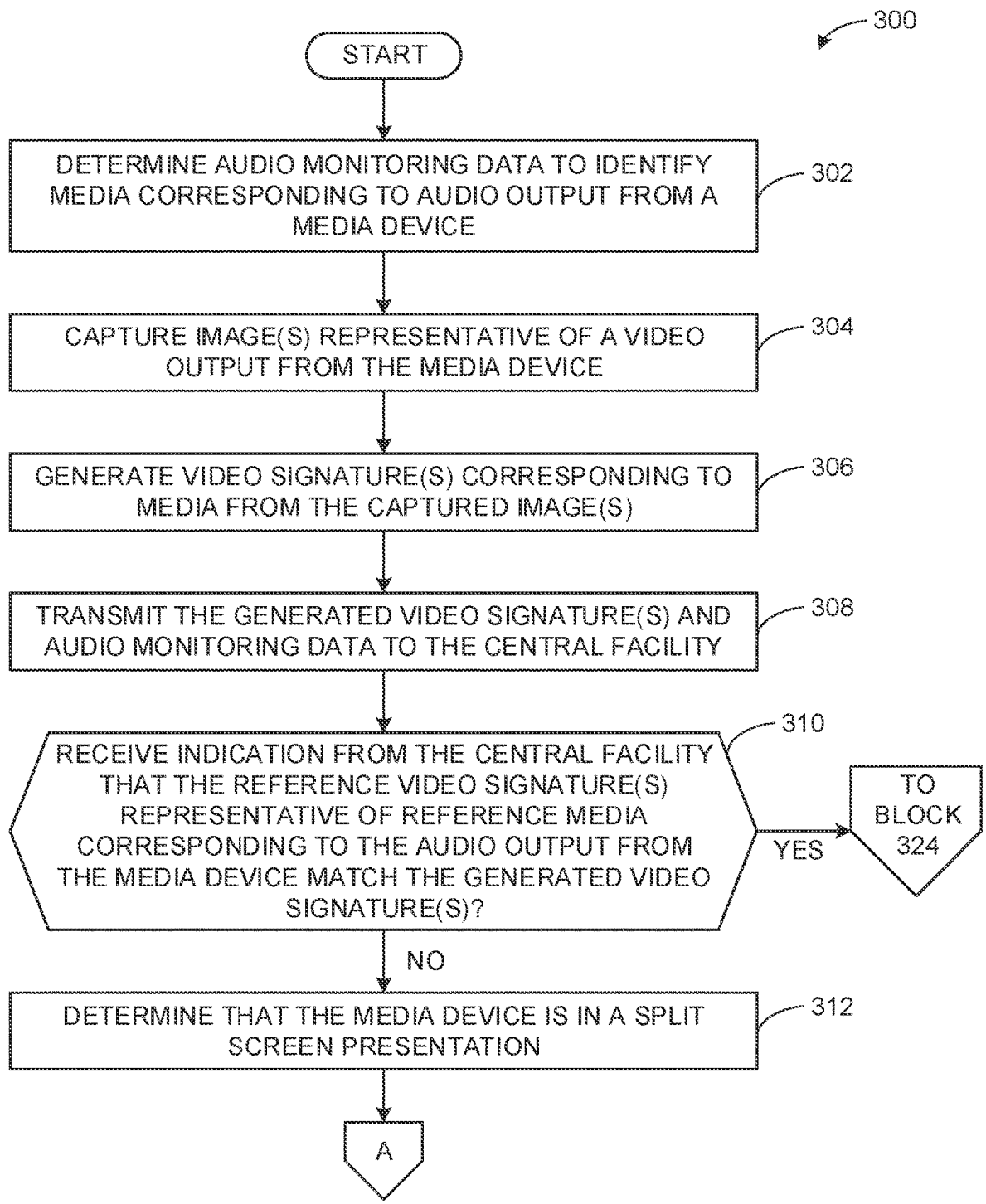
FIGS. 3A-B and 4 are flowcharts representative of machine readable instructions which may be executed to implement the example meter of FIG. 2A.
Figure 3B:
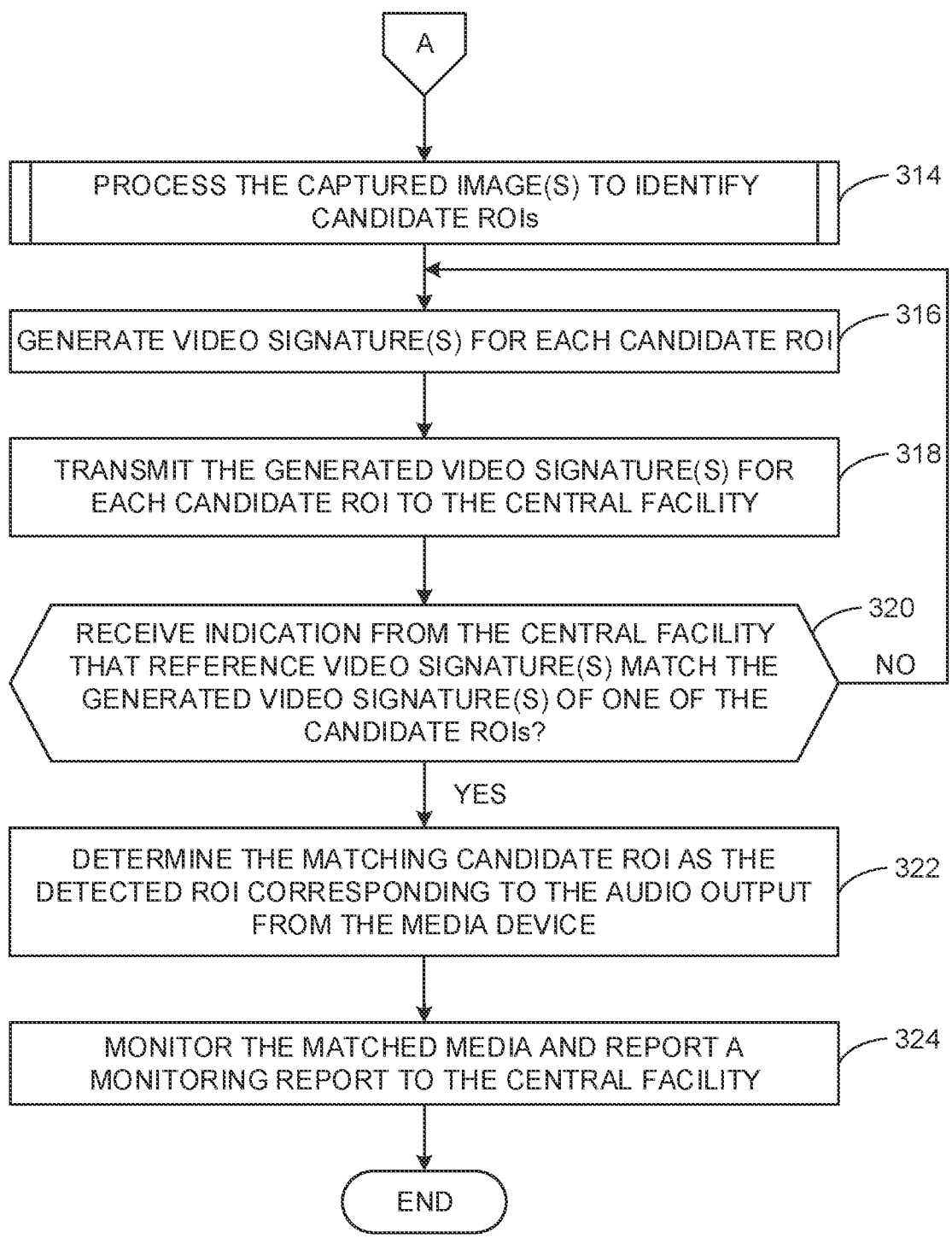

FIGS. 3A-3B are example flow diagrams representative of machine readable instructions 300 that may be executed to implement the meter 114 of the media monitoring system 100 of FIGS. 1, 2A-2B. The example process begins at block 302, wherein the audio processor 202 determines audio monitoring data (e.g., audio signature(s), audio watermark(s), etc.) to identify media corresponding to audio output from a media device (e.g., the media device 106 of FIG. 1). The image creator 214 of the video processor 204 captures one or more images representative of a video output from the media device (block 304). At block 306, the video signature generator 216 of the video processor 204 generates one or more video signature(s) corresponding to the media from the one or more captured images. The monitoring data communicator 220 then transmits the generated video signature(s) and audio monitoring data to the central facility 116 (block 308).

If, at block 310, the monitoring data communicator 220 receives an indication from the central facility 116 that the reference video signature(s) representative of reference media corresponding to the audio output from the media device match the generated video signature(s), then control proceeds to block 324 where the meter 114 monitors the matched media and the monitoring data communicator 220 reports a monitoring report to the central facility 116. If, at block 310, the monitoring data communicator 220 receives an indication from the central facility 116 that the reference video signature(s) representative of reference media corresponding to the audio output from the media device do not match the generated video signature(s), then control proceeds to block 312. At block 312, the monitoring data communicator 220 triggers an indication to the computer vision processor 224 that the video match score is low, and the computer vision processor 224 determines that the media device 106 is in a split screen presentation. At block 314, the example computer vision processor 224 of the split screen detector 206 processes the captured image to identify candidate regions-of-interest (ROIs). An example process that can be used to implement the operation of block 314 is described below in connection with FIG. 4.

At block 316, the example video signature generator 216 of the example video processor 204 generates one or more video signatures for each candidate ROI. Then, at block 318, the monitoring data communicator 220 transmits the generated video signature(s) for each candidate ROI to the central facility 116. If, at block 320, the monitoring data communicator 220 receives an indication from the central facility 116 that the reference video signature(s) do not match the generated video signature(s) of one of the candidate ROIs, then control proceeds back to block 316 to generate new video signature(s) for each candidate ROI. If, at block 320, the monitoring data communicator 220 receives an indication from the central facility 116 that the reference video signature(s) match the generated video signature(s) of one of the candidate ROIs, then control proceeds to block 322. At block 322, the ROI selector 232 determines the matching candidate ROI as the detected ROI corresponding to the audio output from the media device. At block 324, the meter 114 monitors the matched media and the example monitoring data communicator 220 reports a monitoring report to the central facility 116. The example process concludes.

Figure 4:
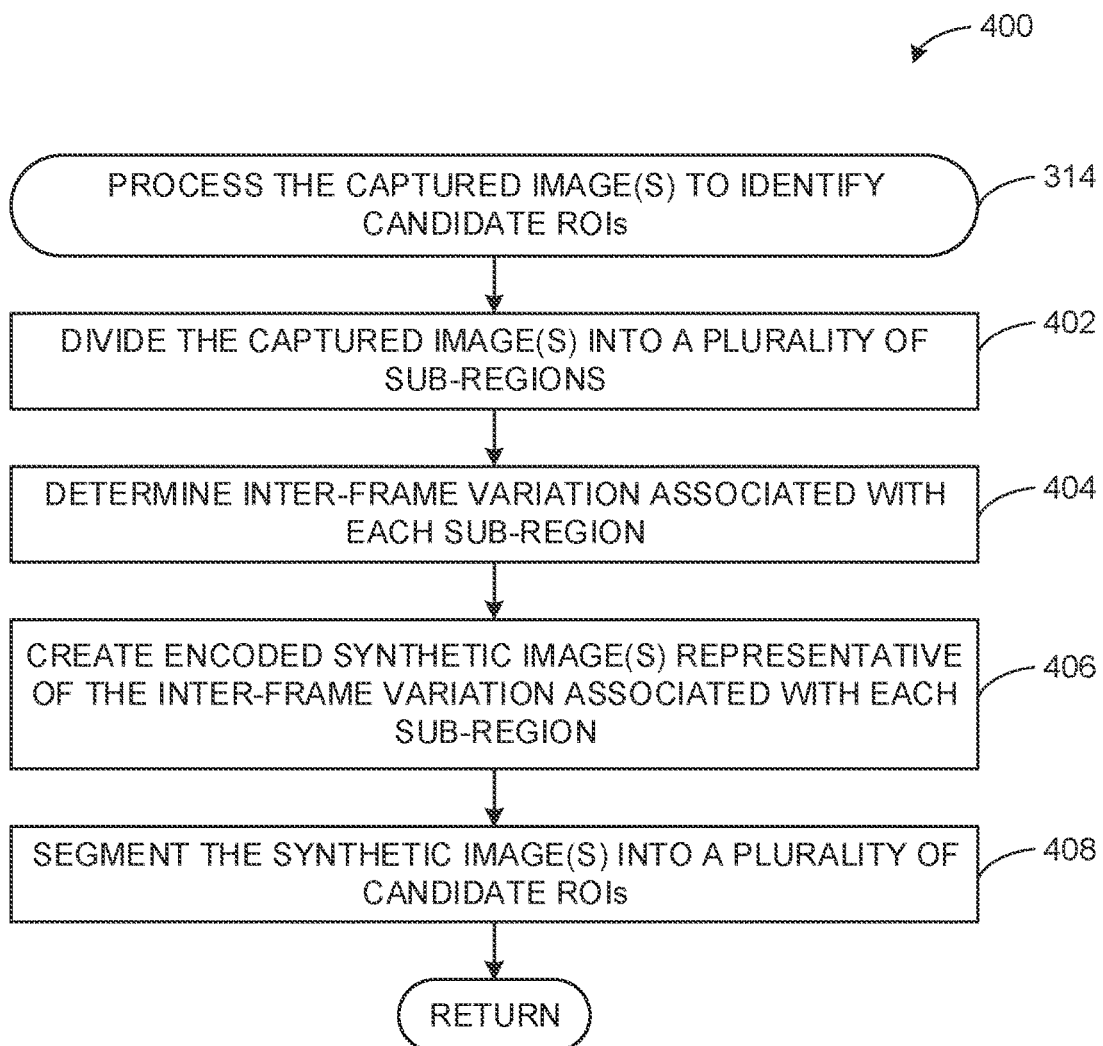

FIG. 4 is an example flow diagram representative of machine readable instructions 400 that may be executed to implement the operation of block 314 of FIG. 3B. The example process begins at block 402 wherein the example image variation detector 226 of the computer vision processor 224 divides the captured image(s) into a plurality of sub-regions. At block 404, the example image variation detector 226 determines the inter-frame variation associated with each of the sub-regions. Any appropriate image processing technique for determining inter-frame variation from successive capture images of a video presentation may be used to perform such a determination. The example image sub-region encoder 228 of the computer vision processor 224 creates encoded synthetic image(s) representative of the inter-frame variation associated with each sub-region (block 406). At block 408, the example ROI segmenter 230 of the computer vision processor 224 segments the synthetic image(s) into a plurality of candidate regions-of-interest (ROIs) and the process concludes.

Figure 5:
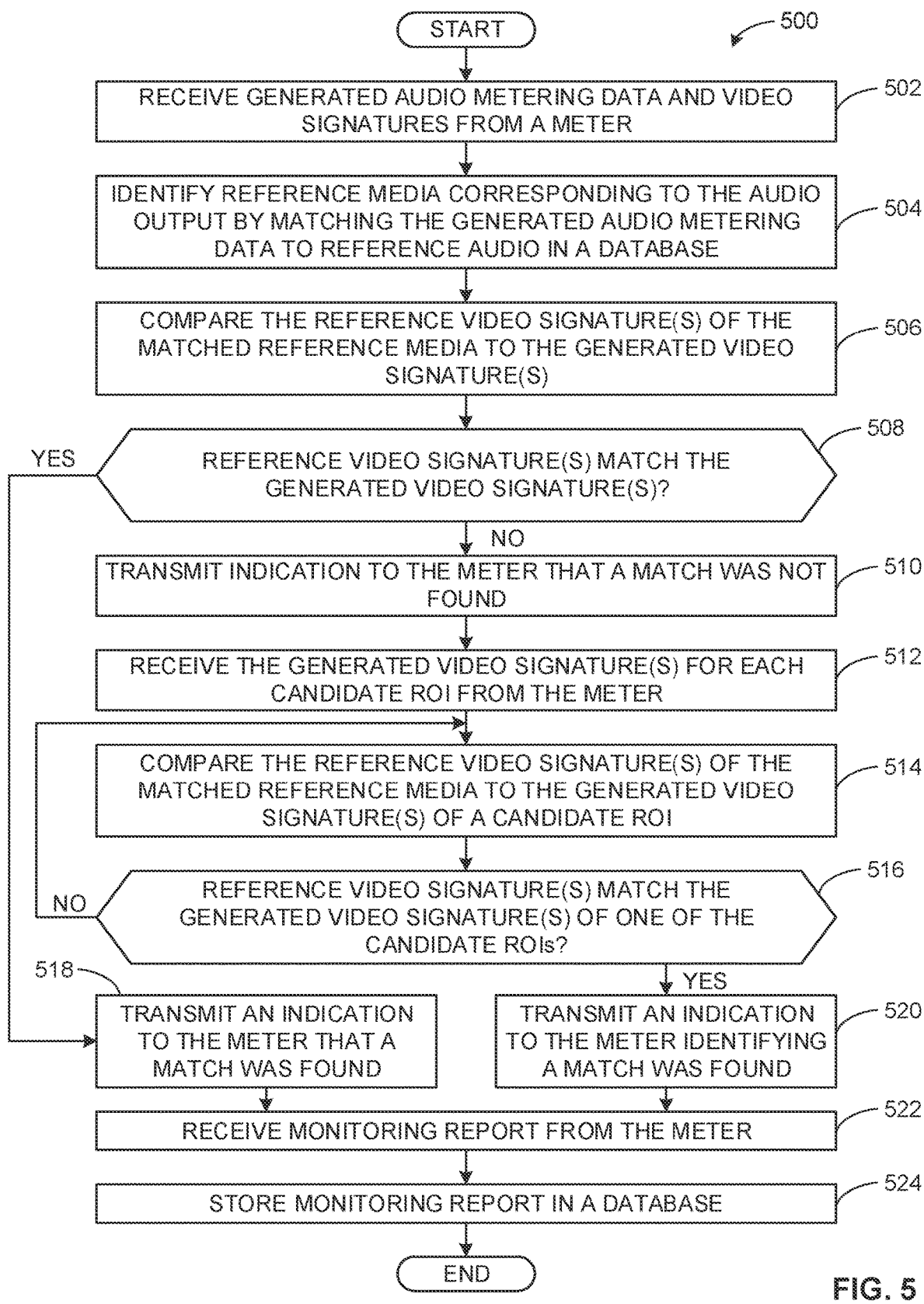
FIG. 5 is an example flowchart representative of machine readable instructions which may be executed to implement the example central facility of FIG. 2B.

FIG. 5 is an example flow diagram representative of machine readable instructions 500 that may be executed to implement the central facility 116 of the media monitoring system 100 of FIGS. 1, 2A-2B. The example process begins at block 502 where the example match communicator 234 receives the generated audio metering data and video signature(s) from the meter 114. At block 504, the example media matcher 236 identifies the media corresponding to the audio output by matching the generated audio metering data to reference audio in an example media database 238. The example signature matcher 240 compares the reference video signature(s) of the matched reference media to the generated video signature(s) (block 506). If, at block 508, the signature matcher 240 determines that the reference video signature(s) match the generated video signature(s), then control proceeds to block 518 in which the example match communicator 234 transmits an indication to the meter 114 that a match was found. If, at block 508, the signature matcher 240 determines that the reference video signature(s) do not match the generated video signature(s), then control proceeds to block 510.

At block 510, the example match communicator 234 transmits an indication to the meter 114 that a match was not found. At block 512, the example match communicator 234 receives the generated video signature(s) for each candidate ROI from the meter 114. The signature matcher 240 then compares the reference video signature(s) of the matched reference media to the generated video signature(s) of a candidate ROI (block 514). If, at block 516, the example signature matcher 240 determines that the reference video signature(s) do not match the generated video signature(s) of one of the candidate ROIs, then control proceeds back to block 514 to compare the reference video signature(s) of the identified reference media to the generated video signature(s) of a new candidate ROI. If, at block 516, the example signature matcher 240 determines that the reference video signature(s) match the generated video signature(s) of one of the candidate ROIs, then control proceeds to block 520. At block 520, the example match communicator 234 transmits an indication to the meter 114 identifying a matching candidate ROI. The example match communicator 234 receives a monitoring report of the monitored identified media from the meter 114 (block 520). At block 522, the example monitoring database 118 stores the monitoring report of the monitored matched media and the process concludes.

Figure 6:
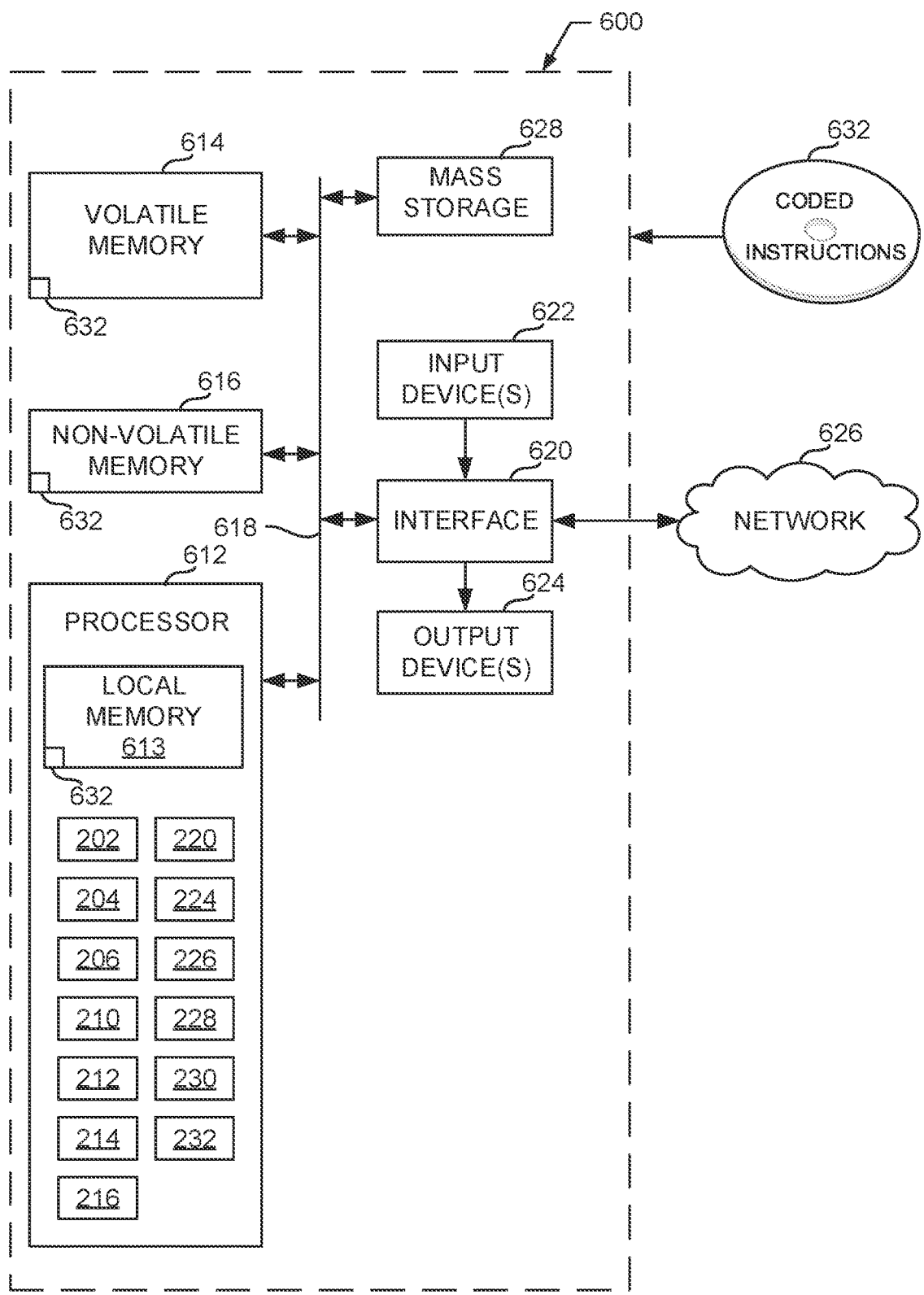
FIG. 6 is a block diagram of an example processing platform structured to execute the instructions of FIGS. 3A-B and 4 to implement the example meter of FIG. 2A.

FIG. 6 is a block diagram of an example processor platform 600 structured to execute the instructions of FIGS. 3A-B, 4 to implement the meter 114 of FIGS. 1, 2A. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example audio processor 202, the example video processor 204, the example split screen detector 206, the example audio signature generator 210, the example watermark detector 212, the example image creator 214, the example video signature generator 216, the example monitoring data communicator 220, the example computer vision processor 224, the example image variation detector 226, the example image sub-region encoder 228, the example ROI segmenter 230, and the example ROI selector 232.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3A-3B, 4 may be stored in the mass storage device 628, in the volatile memory 614, in the non-volatile memory 616, and/or on a removable non-transitory computer readable storage medium such as a CD or DVD.

Figure 7:
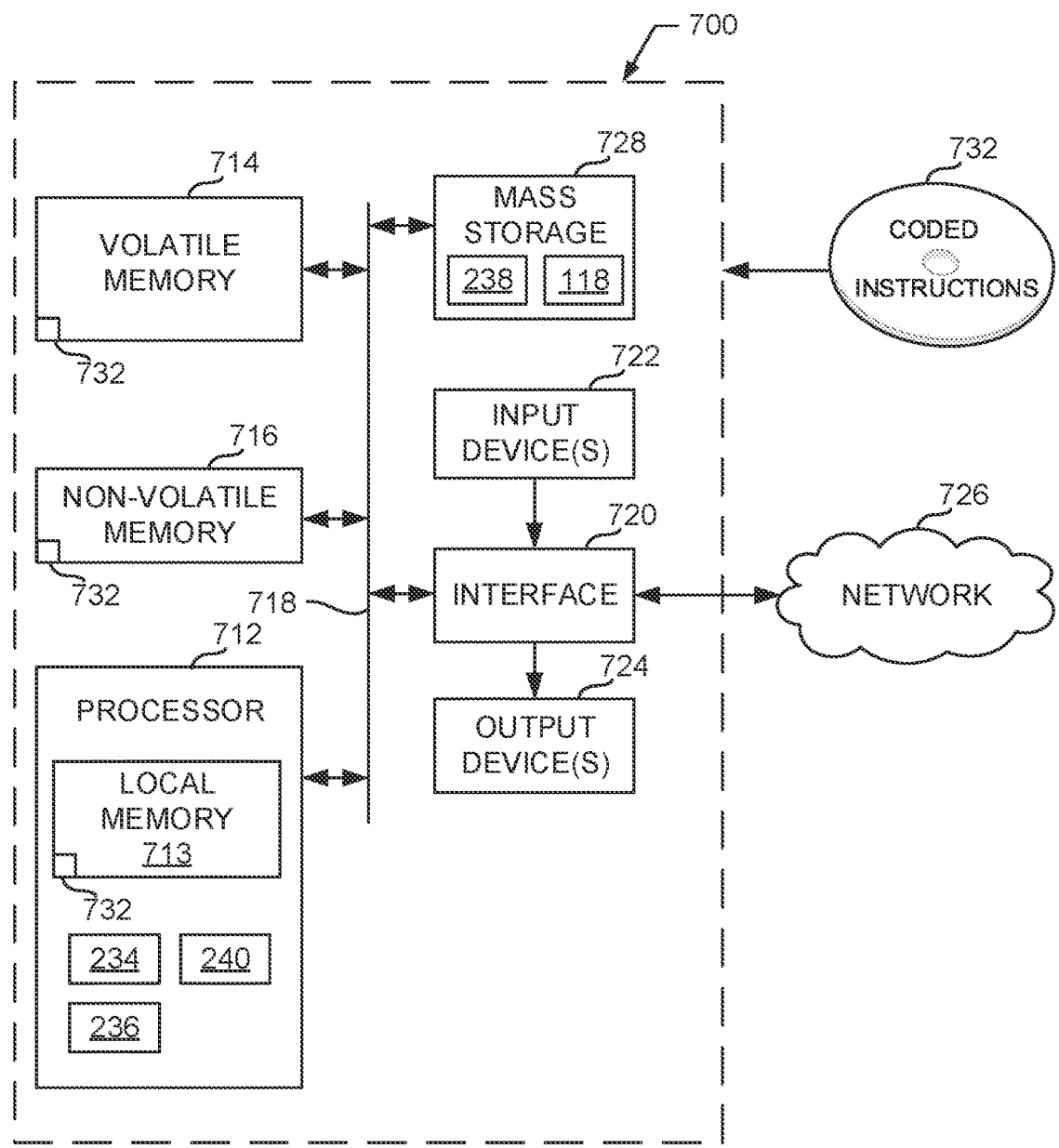
FIG. 7 is a block diagram of an example processing platform structured to execute the instructions of FIG. 5 to implement the example central facility of FIG. 2B.

FIG. 7 is a block diagram of an example processor platform 700 structured to execute the instructions of FIG. 5 to implement the central facility 116 of FIGS. 1, 2B. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device.

In this example, the processor implements the example match communicator 234, the example media matcher 236, and the example signature matcher 240.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIG. 5 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that improve the accuracy of media monitoring by detecting when a media device is providing a split screen presentation. Prior media monitoring units may not be capable of detecting when a media device is in a split screen orientation. In some instances, a media device may be displaying two or more pieces of media simultaneously in a split screen presentation. In such examples, the audio output from the media device may correspond to only one of the respective pieces of media in the split screen presentation. It is in the interest of audience monitoring entities, advertisement companies, broadcast networks, etc. to (1) detect when a media device is experiencing a split screen presentation, and (2) be able to identify which piece of media corresponds to the audio output from the media device. This allows an audience measurement entity to correctly attribute the monitoring data to the respective media. Examples disclosed herein are able to solve the inherently technical problem of detecting when a media device is providing a split screen presentation.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
   accessing one or more video signatures generated based on at least one of multiple images corresponding to video output from a media device;
   accessing audio monitoring data extracted from audio output from the media device, wherein the audio monitoring data includes at least one of an audio signature or an audio watermark generated using the audio output;
   matching the audio monitoring data to reference audio monitoring data corresponding to first media;
   determining that the one or more video signatures do not correspond to the first media;
   in response to determining that the one or more video signatures do not correspond to the first media, assessing that the video output from the media device corresponds to a video presentation format having a plurality of candidate regions-of-interest corresponding to respective sub-regions of the video output from the media device; and
   identifying a first one of the candidate regions-of-interest of the video presentation format that corresponds to the first media.

2. The method of claim 1, further including:
   receiving the one or more generated video signatures from the media device; and
   sending, in response to receiving the one or more generated video signatures, an indication that the one or more generated video signatures do not match reference video signatures.

3. The method of claim 1, wherein identifying the first one of the candidate regions-of-interest includes:
   determining that at least one video signature generated from a sub-region of video output of the media device corresponding to the first one of the candidate regions-of-interest matches the first media.

4. The method of claim 3, further comprising:
   sending, to the media device, an indication that the first one of the candidate regions-of-interest matches the first media; and
   receiving, in response to sending the indication, one or more additional video signatures generated from the sub-region of video output of the media device corresponding to the first one of the candidate regions-of-interest; and determining that the one or more additional video signatures match the first media.

5. The method of claim 1, wherein the plurality of candidate regions-of-interest are identified based on a template indicating at least one previously-matched sub-region of the video output of the media device during a previous video presentation.

6. The method of claim 1, wherein identifying the first one of the candidate regions-of-interest is based on comparisons between the multiple images corresponding to video output from the media device, wherein the multiple images include at least two sequential frames of the video output, and wherein the comparisons are indicative of inter-frame variation associated with ones of the respective sub-regions.

7. A non-transitory computer readable storage medium having stored thereon instructions that, when executed by a processor of a computing system, cause performance of:
   accessing one or more video signatures generated based on at least one of multiple images corresponding to video output from a media device;
   accessing audio monitoring data extracted from audio output from the media device, wherein the audio monitoring data includes at least one of an audio signature or an audio watermark generated using the audio output;
   matching the audio monitoring data to reference audio monitoring data corresponding to first media;
   determining that the one or more video signatures do not correspond to the first media;
   in response to determining that the one or more video signatures do not correspond to the first media, assessing that the video output from the media device corresponds to a video presentation format having a plurality of candidate regions-of-interest corresponding to respective sub-regions of the video output from the media device; and
   identifying a first one of the candidate regions-of-interest of the video presentation format that corresponds to the first media.

8. The non-transitory computer readable storage medium of claim 7, wherein the instructions further cause performance of:
   receiving the one or more generated video signatures from the media device; and
   sending, in response to receiving the one or more generated video signatures, an indication that the one or more generated video signatures do not match reference video signatures.

9. The non-transitory computer readable storage medium of claim 7, wherein identifying the first one of the candidate regions-of-interest includes determining that at least one video signature generated from a sub-region of video output of the media device corresponding to the first one of the candidate regions-of-interest matches the first media.

10. The non-transitory computer readable storage medium of claim 9, wherein the instructions further cause performance of:
   sending, to the media device, an indication that the first one of the candidate regions-of-interest matches the first media; and
   receiving, in response to sending the indication, one or more additional video signatures generated from the sub-region of video output of the media device corresponding to the first one of the candidate regions-of-interest; and
   determining that the one or more additional video signatures match the first media.

11. The non-transitory computer readable storage medium of claim 7, wherein the plurality of candidate regions-of-interest are identified based on a template indicating at least one previously-matched sub-region of the video output of the media device during a previous video presentation.

12. The non-transitory computer readable storage medium of claim 7, wherein identifying the first one of the candidate regions-of-interest is based on comparisons between the multiple images corresponding to video output from the media device, wherein the multiple images include at least two sequential frames of the video output, and wherein the comparisons are indicative of inter-frame variation associated with ones of the respective sub-regions.

13. The non-transitory computer readable storage medium of claim 7, wherein identifying the first one of the candidate regions-of-interest is based on at least one of edge detection, line detection, feature detection, or feature extraction.

14. An audience measurement computing system comprising:
   a processor;
   memory having stored thereon computer-readable instructions that, when executed by the processor, cause performance of operations comprising:
      accessing one or more video signatures generated based on at least one of multiple images corresponding to video output from a media device;
      accessing audio monitoring data extracted from audio output from the media device, wherein the audio monitoring data includes at least one of an audio signature or an audio watermark generated using the audio output;
      matching the audio monitoring data to reference audio monitoring data corresponding to first media;
      determining that the one or more video signatures do not correspond to the first media;
      in response to determining that the one or more video signatures do not correspond to the first media, assessing that the video output from the media device corresponds to a video presentation format having a plurality of candidate regions-of-interest corresponding to respective sub-regions of the video output from the media device; and
      identifying a first one of the candidate regions-of-interest of the video presentation format that corresponds to the first media.

15. The audience measurement computing system of claim 14, wherein the operations further include:
   receiving the one or more generated video signatures from the media device; and
   sending, in response to receiving the one or more generated video signatures, an indication that the one or more generated video signatures do not match reference video signatures.

16. The audience measurement computing system of claim 14, wherein identifying the first one of the candidate regions-of-interest includes determining that at least one video signature generated from a sub-region of video output of the media device corresponding to the first one of the candidate regions-of-interest matches the first media.

17. The audience measurement computing system of claim 16, wherein the operations further include:
- sending, to the media device, an indication that the first one of the candidate regions-of-interest matches the first media; and
- receiving, in response to sending the indication, one or more additional video signatures generated from the sub-region of video output of the media device corresponding to the first one of the candidate regions-of-interest; and
- determining that the one or more additional video signatures match the first media.

18. The audience measurement computing system of claim 14, wherein the plurality of candidate regions-of-interest are identified based on a template indicating at least one previously-matched sub-region of the video output of the media device during a previous video presentation.

19. The audience measurement computing system of claim 14, wherein identifying the first one of the candidate regions-of-interest is based on comparisons between the multiple images corresponding to video output from the media device, wherein the multiple images include at least two sequential frames of the video output, and wherein the comparisons are indicative of inter-frame variation associated with ones of the respective sub-regions.

20. The audience measurement computing system of claim 14, wherein identifying the first one of the candidate regions-of-interest is based on at least one of edge detection, line detection, feature detection, or feature extraction.

\* \* \* \* \*